United States Patent
Newman et al.

(10) Patent No.: US 12,047,894 B2
(45) Date of Patent: Jul. 23, 2024

(54) RAPID LOW-COMPLEXITY SYNCHRONIZATION AND DOPPLER CORRECTION IN 5G/6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

( * ) Notice: Subject to any disclaimer, the term of this patent is extended or adjusted under 35 U.S.C. 154(b) by 0 days.

(21) Appl. No.: 18/473,227

(22) Filed: Sep. 23, 2023

(65) Prior Publication Data

US 2024/0031968 A1     Jan. 25, 2024

Related U.S. Application Data

(63) Continuation of application No. 18/098,982, filed on Jan. 19, 2023, now Pat. No. 11,832,204.
(Continued)

(51) Int. Cl.

| | |
|---|---|
| *H04W 56/00* | (2009.01) |
| *H04J 3/06* | (2006.01) |
| *H04J 11/00* | (2006.01) |
| *H04L 7/00* | (2006.01) |
| *H04L 27/26* | (2006.01) |

(52) U.S. Cl.
CPC .......... *H04W 56/005* (2013.01); *H04J 3/0661* (2013.01); *H04J 3/0667* (2013.01); *H04J 11/00* (2013.01); *H04L 7/0037* (2013.01); *H04L 7/007* (2013.01); *H04L 27/2601* (2013.01); *H04W 56/003* (2013.01); *H04W 56/0055* (2013.01); *H04W 56/0075* (2013.01); *H04J 2011/0013* (2013.01); *H04J 2011/0096* (2013.01)

(58) Field of Classification Search
CPC ............ H04W 56/005; H04W 56/003; H04W 56/0055; H04W 56/0075; H04J 3/0661; H04J 3/0667; H04J 11/00; H04J 2011/0013; H04J 2011/0096; H04L 7/0037; H04L 7/007; H04L 27/2601
See application file for complete search history.

(56) References Cited

U.S. PATENT DOCUMENTS

| | | |
|---|---|---|
| 6,058,101 A | 5/2000 | Huang |
| 7,649,912 B2 | 1/2010 | Balasubramanian |

(Continued)

*Primary Examiner* — Bailor C Hsu

(57) ABSTRACT

In busy 5G and 6G networks, precise timing and synchronization are key to maintaining throughput with low fault rates. Disclosed are systems and methods for adjusting each user device's clock for proper reception, including downlink propagation delays, uplink propagation delays, round-trip propagation delays, and Doppler shifts, individually for each user device, and including any uplink/downlink asymmetries. The clock adjustment and timing advance of each user device is based on a predetermined transmission schedule for timing signals, broadcast by the base station. The Doppler shift is measured by the base station, according to uplink timing signals, and communicated to the user device in a single final timing signal. The single final timing signal is either frequency-shifted by the measured Doppler shift, or delayed proportional to the Doppler shift, either of which indicates, to the user device, how to apply the correct timing to future uplink messages.

10 Claims, 8 Drawing Sheets

Related U.S. Application Data

(60) Provisional application No. 63/437,839, filed on Jan. 9, 2023, provisional application No. 63/435,061, filed on Dec. 23, 2022, provisional application No. 63/476,032, filed on Dec. 19, 2022, provisional application No. 63/431,810, filed on Dec. 12, 2022.

(56) References Cited

U.S. PATENT DOCUMENTS

| | | | |
|---|---|---|---|
| 7,991,362 B2 | 8/2011 | Lane | |
| 8,897,818 B2* | 11/2014 | Weng | H04W 68/025 |
| | | | 455/574 |
| 10,375,659 B1 | 8/2019 | Ramlall | |
| 10,498,578 B2* | 12/2019 | Hu | H04L 27/2671 |
| 10,868,664 B2 | 12/2020 | Goldin | |
| 11,050,599 B2* | 6/2021 | Zhang | H04W 56/003 |
| 11,563,484 B2* | 1/2023 | Wang | H04W 56/0005 |
| 11,729,736 B2* | 8/2023 | Farag | H04L 27/2607 |
| | | | 370/503 |
| 2008/0112509 A1 | 5/2008 | Bock | |
| 2008/0186906 A1 | 8/2008 | Defrance | |
| 2010/0097153 A1 | 4/2010 | Rexberg | |
| 2011/0216816 A1 | 9/2011 | Frenzel | |
| 2013/0003757 A1 | 1/2013 | Boatright | |
| 2013/0198276 A1 | 8/2013 | Leppanen | |
| 2014/0068315 A1 | 3/2014 | Aweya | |
| 2014/0086219 A1 | 3/2014 | Suzuki | |
| 2014/0140456 A1 | 5/2014 | Tavildar | |
| 2014/0219162 A1* | 8/2014 | Eyuboglu | H04L 5/005 |
| | | | 370/315 |
| 2015/0341875 A1 | 5/2015 | Kwak | |
| 2016/0028533 A1 | 1/2016 | Kazmi | |
| 2017/0013582 A1* | 1/2017 | Takekawa | H04W 56/0045 |
| 2017/0288801 A1 | 10/2017 | Aweya | |
| 2018/0059712 A1 | 3/2018 | Kazehaya | |
| 2018/0145780 A1 | 5/2018 | Zhao | |
| 2018/0279363 A1 | 9/2018 | Su | |
| 2019/0306821 A1 | 10/2019 | Hu | |
| 2019/0326916 A1 | 10/2019 | Parra Vilchis | |
| 2020/0053678 A1 | 2/2020 | Moon | |
| 2020/0228220 A1 | 7/2020 | Joseph | |
| 2020/0236693 A1* | 7/2020 | Xing | H04W 72/1263 |
| 2020/0322908 A1* | 10/2020 | Prakash | H04W 56/001 |
| 2020/0351189 A1 | 11/2020 | Horn | |
| 2020/0367187 A1 | 11/2020 | Palenius | |
| 2021/0068092 A1 | 3/2021 | Abedini | |
| 2021/0159995 A1 | 5/2021 | Zhang | |
| 2021/0329580 A1* | 10/2021 | Kim | H04W 56/0015 |
| 2021/0400610 A1 | 12/2021 | Aijaz | |
| 2022/0039038 A1 | 2/2022 | Liu | |
| 2022/0104233 A1* | 3/2022 | Jeon | H04L 5/0051 |
| 2022/0123849 A1 | 4/2022 | McCall | |
| 2022/0167296 A1 | 5/2022 | Park | |

* cited by examiner

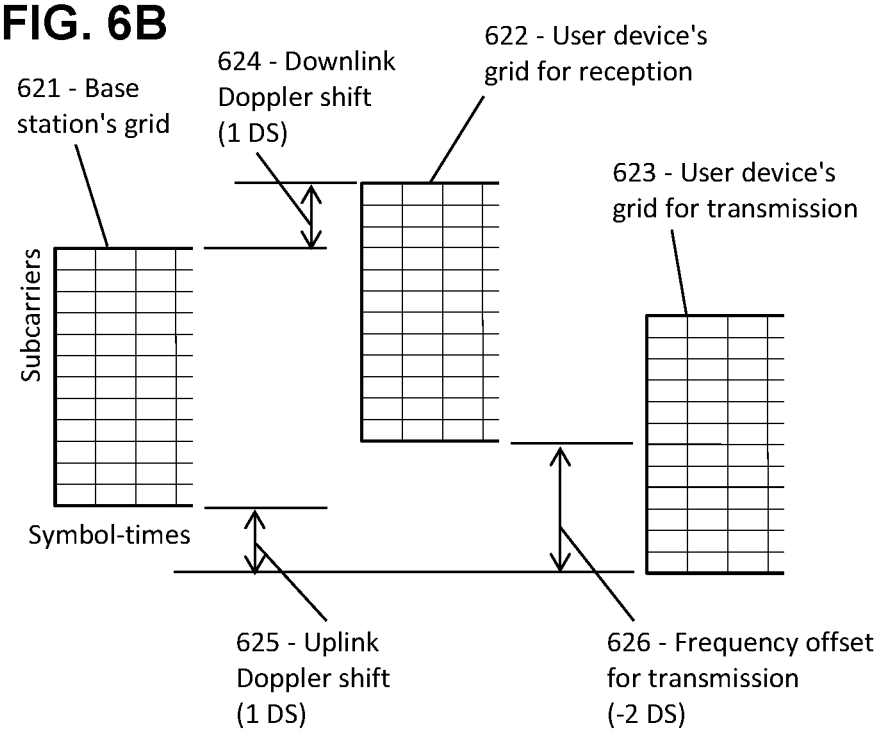

RAPID LOW-COMPLEXITY SYNCHRONIZATION AND DOPPLER CORRECTION IN 5G/6G

PRIORITY CLAIMS AND RELATED APPLICATIONS

This application is a continuation of U.S. patent application Ser. No. 18/098,982, entitled "Ultra-Lean Synchronization Procedure for 5G and 6G Networking", filed Jan. 19, 2023, which claims the benefit of U.S. Provisional Patent Application Ser. No. 63/431,810, entitled "Mid-Symbol Timestamp Point for Precision Synchronization in 5G and 6G", filed Dec. 12, 2022, and U.S. Provisional Patent Application Ser. No. 63/476,032, entitled "Guard-Space Timestamp Point for Precision Synchronization in 5G and 6G", filed Dec. 19, 2022, and U.S. Provisional Patent Application Ser. No. 63/435,061, entitled "Compact Timing Signal for Low-Complexity 5G/6G Synchronization", filed Dec. 23, 2022, and U.S. Provisional Patent Application Ser. No. 63/437,839, entitled "Ultra-Lean Synchronization Procedure for 5G and 6G Networking", filed Jan. 9, 2023, all of which are hereby incorporated by reference in their entireties.

FIELD OF THE INVENTION

The disclosure pertains to synchronization of clocks using a wireless message that contains a timestamp point.

BACKGROUND OF THE INVENTION

Wireless messages depend on tightly controlled timing, so that modulated signals will be received at the expected time with the correct frequency. Distributing the timing information by cable is no longer feasible, as many users are mobile or at least portable; hence the time synchronization and clock rate are generally distributed in wireless messages. Due to the very high frequencies planned for in 5G and 6G, improved means are needed to enable user devices to synchronize their timing and frequency precisely, without excessive messaging and overhead.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a user device of a wireless network to communicate with a base station of the wireless network, the method comprising: configuring a transmission resource grid and a reception resource grid, wherein each grid, of the transmission resource grid and the reception resource grid, comprises symbol-times in time and subcarriers in frequency, the symbol-times and subcarriers according to a clock of the user device; determining a downlink propagation time interval comprising a time interval for a downlink signal to propagate from a transmitter in the base station to a receiver in the user device; retarding the symbol-times of the reception resource grid, relative to symbol-times of a base station resource grid, by the downlink propagation time interval; determining a round-trip propagation time interval comprising the downlink propagation time interval plus a time interval for an uplink signal to propagate from a transmitter of the user device to a receiver of the base station; advancing the symbol-times of the transmission resource grid, relative to the symbol-times of the reception resource grid, by the round-trip propagation time interval; transmitting, according to the transmission resource grid, an uplink message to the base station; and receiving, according to the reception resource grid, a downlink message from the base station.

In another aspect, there is a method for a base station of a wireless network to communicate with a user device of the wireless network, the method comprising: broadcasting a system information message indicating a schedule for transmitting timing signals, a time interval Dfreq between the timing signals, and another time interval Dreply; broadcasting, according to the schedule, a first timing signal; after the time interval Dfreq, broadcasting a second timing signal; receiving, from the user device, an uplink message comprising a third timing signal; then waiting the time interval Dreply; and then transmitting a fourth timing signal to the user device.

In another aspect, there is a method for a user device of a wireless network to synchronize with a base station, the method comprising: receiving a first timing signal and recording a first reception time according to a clock of the user device; receiving a second timing signal and recording a second reception time according to the clock of the user device; determining a transmission time interval comprising a predetermined transmission time of the second timing signal minus a predetermined transmission time of the first timing signal; determining a reception time interval comprising the second reception time minus the first reception time; determining a time error comprising a difference between the transmission time interval and the reception time interval; determining a frequency error comprising the time error divided by the reception time interval; and adjusting a frequency of the clock of the user device according to the frequency error.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

FIG. 6B is another schematic showing an exemplary embodiment of resource grids in a user device and a base station, according to some embodiments.

Like reference numerals refer to like elements throughout.

DETAILED DESCRIPTION

Figure 1A:
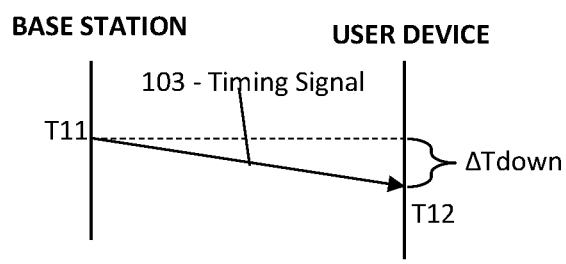
FIG. 1A is a schematic showing an exemplary embodiment of a timing signal, according to some embodiments.

Systems and methods disclosed herein (the "systems" and "methods", also occasionally termed "embodiments" or "arrangements" or "versions" or "examples", generally according to present principles) can provide urgently needed wireless communication protocols for precisely synchronizing clocks using brief timing signals, without exchanging cumbersome legacy synchronization messages. Lean and efficient procedures are disclosed for precise time and frequency adjustment, thereby providing that downlink messages arrive compliant with the timing and frequency of the user device's resource grid, and that uplink messages arrive at the correct time and frequency of the base station's resource grid, so that both entities can receive and demodulate their incoming messages. Importantly, the disclosure shows how the user devices can be fully synchronized with the base station using brief timing signals alone, without transmitting or receiving any textual or numerical messages, thereby saving substantial time and power, according to some embodiments. Improved precision timing with reduced overhead will be required for reliable communication at the high frequencies and dense networks planned for 5G and 6G.

In managed networks, uplink and downlink messages are required to arrive at the recipient at a particular time and frequency, according to the recipient's resource grid. For example, each message element of an uplink message is expected to arrive aligned in time and frequency with the base station's resource grid, specifically at a time within the base station's symbol boundaries, and at a frequency centered on one of the base station's subcarriers. Likewise, the user device is expected to arrange its resource grid so that each message element of a downlink message will arrive within a symbol-time and a subcarrier of the user device's resource grid. To do so, the user device may adjust four parameters: the clock time of the user device, the clock rate (or frequency) of the user device, a timing advance based on the propagation time, and a Doppler frequency shift caused by motion.

The disclosed procedures are intended to enable a user device to adjust its clock time and clock frequency so that downlink messages will then arrive synchronous with the user device's symbol-times and centered within the user device's subcarrier frequencies, for optimal downlink messaging reliability. The procedures are also intended to enable the user device to adjust its uplink timing advance for proper timing at the base station, and to adjust its uplink frequency offset for proper frequency alignment to cancel Doppler frequency shifts. The timing advance equals the downlink propagation time plus certain small electronic delays, while the frequency offset corresponds to a Doppler shift. Each of these four adjustments can be accomplished with ultra-lean procedures using brief timing signals, without the message-heavy overhead of legacy synchronization procedures.

The examples presented herein are suitable for adoption by a wireless standards organization. Providing ultra-lean procedures for time and frequency alignment, in both uplink and downlink messaging, may enable user devices to rapidly synchronize to the base station, thereby optimizing communication reliability at high frequencies, without unnecessary messaging.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time" bounded by "symbol boundaries", and a specific frequency and bandwidth termed a "subcarrier" (or "subchannel" in some references). Symbol periods may be termed "OFDM symbols" (Orthogonal Frequency-Division Multiplexing) in which the individual signals of multiple subcarriers are added in superposition. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. System information files include an SSB (synchronization signal block) message or an SIB1 (first system information block) message or the like. Managed channels include the PDCCH and PUCCH (physical downlink and uplink control channels) and PDSCH and PUSCH (physical downlink and uplink shared channels) as well as the RACH (random access channel).

In addition to the 3GPP terms, the following terms are defined. As used herein, a "timing signal" is a brief (1-3 resource elements, typically) transmission that includes timing information. Although in references a modulated resource element of a message may be referred to as a "symbol", this may be confused with the same term for a time interval ("symbol-time"), or a composite waveform ("OFDM symbol"), among other things. Therefore, each modulated resource element of a message is referred to as a "modulated message resource element", or more simply as a "message element", in examples below. Each symbol-time is bounded by symbol boundaries, according to a resource grid of symbol-times and subcarrier frequencies. "RF" or radio-frequency refers to electromagnetic waves in the MHz (megahertz) or GHz (gigahertz) frequency ranges. A "timing advance" is an time at which an uplink message is transmitted so that it will arrive at a base station synchronous with the base station's resource grid. A "frequency offset" is a frequency correction applied to uplink messages so that the uplink messages can arrive at the base station with a frequency of the base station's subcarriers. A "fiducial" is a part of a timing signal such as the leading or trailing edge or the midpoint. A "timestamp point" is an abrupt or shaped modulation change in a timing signal, and is generally used as a fiducial for improved time precision. Two clocks are "synchronized" if they read the same time or are offset by a known amount. Clock rate and clock frequency are used interchangeably.

Turning now to the figures, examples show how a user device can synchronize its clock to the base station.

FIG. 1A is a schematic showing an exemplary embodiment of a timing signal, according to some embodiments. As depicted in this non-limiting example, actions of a base station are shown at left, and of a user device on the right. Time flows downward. At time T11, the base station broadcasts a timing signal 103 on the PDCCH (physical downlink control channel) or other suitable channel. The transmission time may be scheduled and predetermined in, for example, a synchronization schedule or a predetermined format, which the user device knows. The user device receives the timing signal 103 at time T12, which is delayed by a downlink propagation time (including electronic delays in the transmitting and receiving antennas) indicated as ΔTdown, which here equals the interval T12−T11.

In various embodiments, the timing signal 103 may be provided in a single resource element (that is, at a single subcarrier frequency and a single symbol-time of a resource grid), or multiple resource elements such as two or three time-spanning resource elements. The timing signal 103 may include a timestamp point to more precisely demark the times, for example. The timestamp point may be an abrupt or shaped variation in the modulation of the timing signal 103, such as a change in amplitude or phase modulation, or an abrupt interchange of quadrature branches, for example. Alternatively, the timestamp point may be transmitted in the middle of the resource element of the timing signal 103, or in the guard-space of the resource element, or in the guard-space of an OFDM symbol that includes the resource element, for example. Alternatively, the timing signal 103 may be a time-spanning triple in which a uniform wave is transmitted in the middle symbol-time, surrounded by two blank resource elements with no transmission. In each version, the user device can determine a time of the timestamp point according to the time of the symbol boundary or modulation change or branch interchange, etc.

The particular resource element(s) of the timing signal 103, and the format of the timing signal 103, may be specified by convention, or a system information file, or a message associated with initial access, or otherwise made known to the user device.

The user device, upon receiving the timing signal 103 and determining the time of the timestamp point, may then adjust the time setting of the user device's internal clock. For example, the user device can adjust its clock time to equal the specified transmission time, as indicated by convention or system information file, etc. In that case, the clock of the user device will be retarded (set later) relative to the clock of the base station, and the retardation is equal to ΔTdown, the propagation time of the timing signal 103. Such a time-retarded clock may be convenient for the user device because downlink messages arrive after a propagation delay. In many applications, the user device communicates only with the base station and does not need an absolute time setting. In such cases, it is convenient to set the user device's clock retarded by ΔTdown, so that downlink messages will arrive at the user device aligned with the user device's symbol boundaries, thereby facilitating demodulation without the need for time corrections upon reception.

Figure 1B:
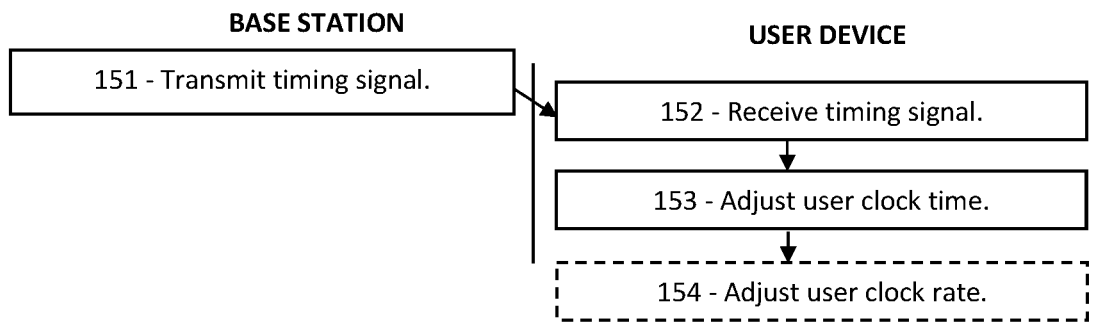
FIG. 1B is a flowchart showing an exemplary embodiment of a timing procedure, according to some embodiments.

FIG. 1B is a flowchart showing an exemplary embodiment of a timing procedure, according to some embodiments. As depicted in this non-limiting example, actions of a base station are shown on the left and actions of a user device are shown on the right. At 151, the base station broadcasts a timing signal, such as the timing signal 103 of the previous example. At 152, after a propagation delay (suggested by a tilted arrow), the user device receives the timing signal and determines a time associated with the timing signal. For example, the base station can include a timestamp point at a particular predetermined time of the timing signal (according to the base station's clock), thereby indicating a precise time within a single symbol-time. The particular time of transmission of the timestamp point as-transmitted, may be specified in a synchronization schedule or format, which may be included in a system information file such as an SSB or SIB1 message, for example.

The user device can measure the time of the timestamp point as-received, according to the user device's clock. The user device can then compare the time of the received timestamp point to the expected time, as specified in the synchronization schedule. The user device can thereby determine a time error equal to the difference between the observed and scheduled times. At 153, the user device can correct its (the user device's) clock time by subtracting the time error, thereby restoring synchronization with the base station, including the retardation of one downlink propagation time.

In another embodiment, the user device can record the time error in a memory, and can leave the clock setting unchanged. The user device can then adjust its resource grid symbol boundaries according to the time error so that subsequent downlink messages are still synchronous with the user device's resource grid. By either method, the user device can thereby receive downlink messages correctly timed with the user device's symbol boundaries, as desired.

Optionally, in dash 154, the user device may be able to measure the frequency of the timing signal, and may adjust the local clock rate accordingly. As mentioned, the obtainable precision generally depends on the configuration of the timing signal. If a frequency error is large enough, it may be discerned and corrected, in some cases. Fine-tuning of the clock rate may require the procedure of the following example.

Figure 2A:
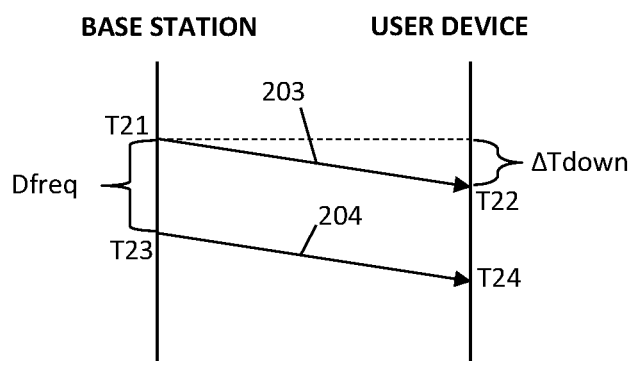
FIG. 2A is a schematic showing an exemplary embodiment of a frequency adjustment, according to some embodiments.

FIG. 2A is a schematic showing an exemplary embodiment of a frequency adjustment, according to some embodiments. As depicted in this non-limiting example, the user device adjusts both its clock time and its clock rate according to the base station's clock time and rate. The base station broadcasts two timing signals 203 204 at predetermined times T21 and T23 according to a schedule, the two timing signals 203 204 separated by a predetermined frequency-setting delay Dfreq as determined by the base station's clock. The timing signals 203 204 may include timestamp points to provide higher time resolution. The frequency-setting delay Dfreq may be specified by convention or system information files, for example. In some embodiments, the base station may transmit timing signals periodically, in which case the frequency-setting delay equals the transmission period.

The user device can measure the times T22 and T24 at which the two timing signals 203 204 are received, according to the user device's clock. If the timing signals 203 204 include timestamp points, these may enable the user device to measure the times and the T24−T22 interval more precisely. Both timing signals 203, 204 have the same propagation delay ΔTdown; hence they are still separated by Dfreq when received. (In this example, the user device is assumed to be at a fixed location; the mobile case is discussed in a later example.)

In a first embodiment, the user device can check its clock rate (or frequency) by measuring the time interval T24−T22 according to its own clock. If the measured value differs from the specified value of the delay Dfreq, the difference indicates how far in frequency the user device's clock rate has drifted from the base station's clock rate. The fractional frequency error is equal to the difference between the measured and expected interval, divided by Dfreq, that is, (T24−T22−Dfreq)/Dfreq. The user device can adjust its clock rate accordingly. The user device can also adjust its clock time again, according to the second timing signal 204, to remove any time errors that may have accumulated since the previous time adjustment.

In a second embodiment, the user device can measure a first time T22 according to the first timing signal 203, and a second time T24 according to the second timing signal 204. If the timing signals 203 204 include timestamp points such as abrupt modulation changes, the user device can determine the time of each timestamp point relative to the preceding symbol boundary, for example. The user device can then compare those two time measurements relative to the user device's symbol boundaries. If the two times are equal (that is, they have the same position relative to the preceding symbol boundary in each case), then the user device's clock is oscillating at the same frequency as the base station's clock. If the two times are different, the receiver can calculate a fractional frequency error equal to the difference in time of each timing signal, divided by the predetermined time separation between the two transmissions.

By either method, or other equivalent method for determining the frequency error according to the difference between two spaced-apart timing signals 203 204, the user device can adjust its clock time and its clock rate according to the base station, at a cost of just two brief timing signals. Since the synchronization schedule and the Dfreq delay are predetermined and known to the user device, bulky synchronization messages and other legacy overhead have been avoided. In addition, since the timing signals 203 204 are broadcast for all to receive, all of the user devices in a network can synchronize their clocks and frequencies to the base station simultaneously, with no additional cost and no unnecessary messaging.

Figure 2B:
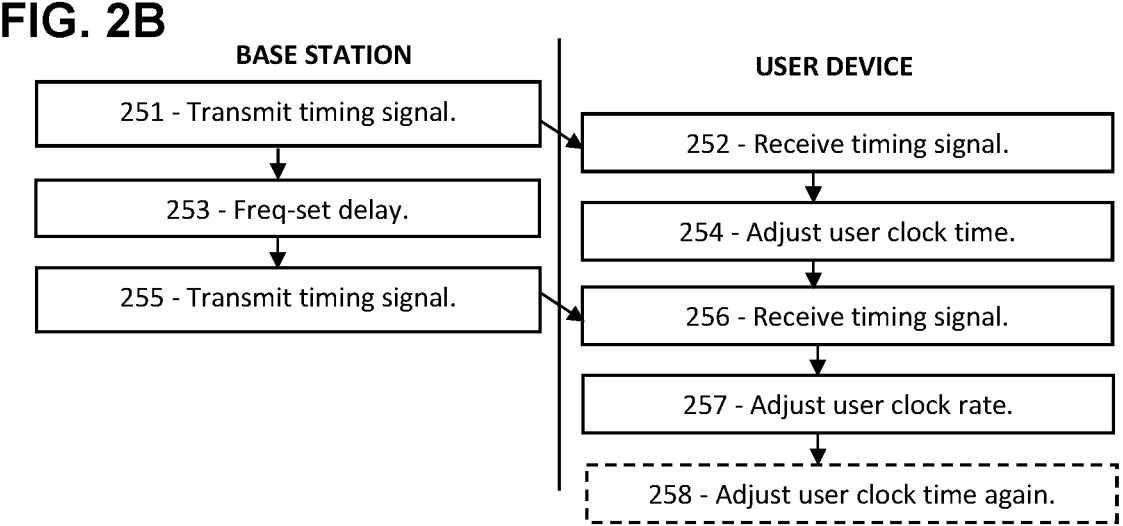
FIG. 2B is a flowchart showing an exemplary embodiment of a frequency adjustment procedure, according to some embodiments.

FIG. 2B is a flowchart showing an exemplary embodiment of a frequency adjustment procedure, according to some embodiments. As depicted in this non-limiting example, actions of a base station are shown on the left and actions of a user device on the right. At 251, the base station broadcasts a timing signal at a predetermined time and frequency, and the user device receives the timing signal at 252. The user device can compare, according to the user device's clock, the received time (such as a timestamp point embedded in the timing signal) relative to the specified transmission time. The user device can then adjust the time of its clock at 254 to negate any difference. In the mean time, the base station waits a predetermined frequency-setting delay at 253, and then broadcasts a second timing signal at 255. The user device receives the second timing signal at 256, measures the time interval between the timing signals (or for extra precision, the interval between timestamp points in those timing signals) according to its own clock, and determines whether the measured time interval agrees with that specified frequency-setting delay. If the measured interval is not equal to the predetermined frequency-setting delay, the user device can adjust its clock rate accordingly, to match the base station's clock rate at 257.

Alternatively, the user device can compare the times of each timing signals (or their embedded timestamp points) relative to the nearest preceding symbol boundary of the receiver's resource grid, and thereby determine a timing difference divided by the specified interval between the timing signals, and thereby determine a frequency error. By either method, the user device can then correct its local clock to match that of the base station.

Optionally, and preferably, the user device can adjust its clock time again at 258, after receiving the second timing signal, to re-synchronize with the base station.

Figure 3A:
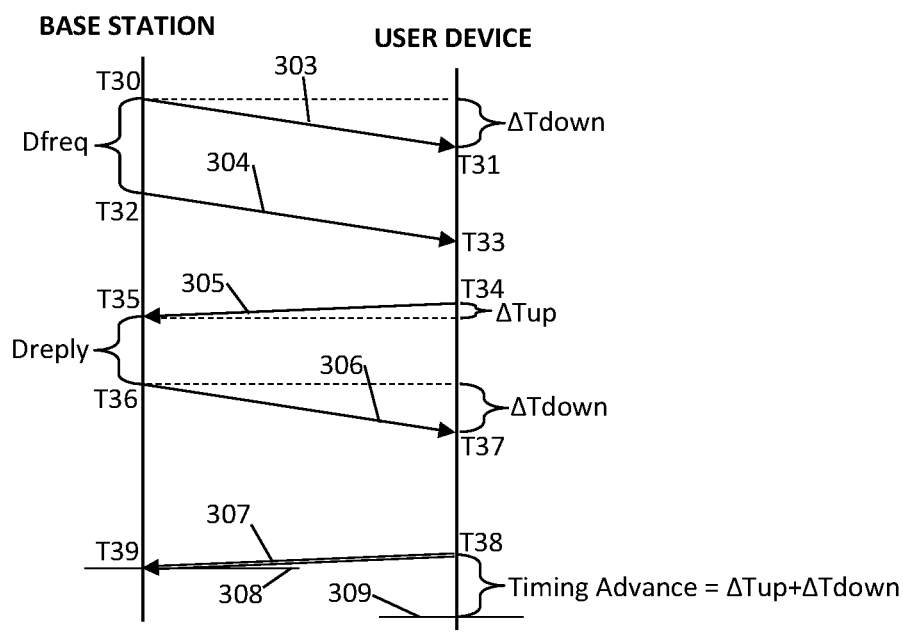
FIG. 3A is a schematic showing an exemplary embodiment of a timing advance determination, according to some embodiments.

FIG. 3A is a schematic showing an exemplary embodiment of a timing advance determination, according to some embodiments. As depicted in this non-limiting example, actions of a base station are shown on the left and actions of a user device on the right. The base station broadcasts a first timing signal 303 at time T30 at a specific predetermined time according to standard formats or system information files, etc. such as according to a synchronization schedule which is known to the user device. The user device detects the timing signal 303 after a propagation delay ΔTdown at time T31. The user device sets its clock time equal to the scheduled transmission time and thereby synchronizes with the base station, but with its clock retarded by one propagation time relative to the base station's clock.

Then, after a predetermined and specified delay Dfreq, the base station transmits a second timing signal 304 at time T32, which the user device detects at T33. The user device can then measure a time error according to the second timing signal 304, which is directly proportional to a frequency error since the user device's clock was synchronized upon the first timing signal 303. The frequency error equals, to sufficient approximation, the timing error of the second timing signal 303 divided by the scheduled interval Dfreq. Alternatively, the user device can measure the interval T33–T31 and compare to the predetermined specified interval Dfreq. In either case, the user device can adjust its clock rate to agree with the base station's clock rate, based on the calculated frequency error.

Having adjusted its clock time and clock rate in accordance with the base station's clock, the user device can then determine the timing advance. The timing advance is a time correction that the transmitter applies to a transmitted message so that the message will arrive at the destination with the proper timing. In this context, the timing advance provides that uplink messages will arrive at the base station aligned with the base station's symbol boundaries, and therefore the timing advance cancels both the uplink propagation delay plus the retarded time setting of the user device. Hence, the timing advance is equal to the round-trip propagation delay equal to the downlink propagation delay plus the uplink propagation delay: TA=$\Delta$Tdown+$\Delta$Tup.

In this example, the uplink propagation delay is not assumed equal to the downlink propagation delay; the same procedure suffices regardless of the propagation time asymmetry, if any. In the figure, $\Delta$Tup is shown very different from $\Delta$Tdown to accentuate the distinction and to show that the user device nevertheless determines the proper timing advance for uplink message alignment. Indeed, the user device does not know, and does not need to know, the asymmetry between the uplink and downlink propagation times, since the brief timing signals provide all the information needed to enable the user device to deliver uplink messages to the base station in compliance with the base station's symbol boundaries and subcarriers, according to some embodiments.

To determine the timing advance, the user device transmits an uplink timing signal 305 at time T34 on a suitable channel for transmitting a downlink timing signal at an arbitrary time. For example, the channel may be contention-based channel, such as the random access channel, or a channel allocated for at-will transmissions. Other options are disclosed in a later example, including options for tightly managed channels.

The uplink timing signal 305 is received by the base station at T35, after an uplink propagation delay $\Delta$Tup. The base station then waits a predetermined and specified "Dreply" delay, and then broadcasts a downlink timing signal 306 at time T36. In this case for simplicity, the downlink timing signal 306 is transmitted on the same channel as the uplink timing signal 305, although in other embodiments the uplink and downlink could use different channels. The user device receives the downlink timing signal 306 after the downlink propagation time $\Delta$Tdown at time T37. The user device can then calculate the round-trip propagation time equal to the elapsed time T37–T34 interval (the time interval between the user device's transmission and subsequent reception), minus the known Dreply delay. The user device can then prepare its timing advance, which is equal to the round-trip propagation delay, which is equal to the elapsed time interval T37–T34 minus Dreply. (The timing advance is equal to the round-trip propagation delay because the user device's clock is set retarded, by $\Delta$Tdown, relative to the base station. In addition, the uplink message will require $\Delta$Tup to reach the base station. Hence the total timing advance equals the round-trip propagation time.) As used herein, the timing advance is relative to the user device's retarded clock setting, not the base station's clock. For purposes of providing uplink messages aligned with the base station's resource grid, the user device does not know, nor need to know, the uplink or downlink propagation times, in this example.

The user device then transmits an uplink data message 307 (doublewide arrow) to the base station at T38. The time T38 is early by the timing advance, relative to the device's resource symbol boundary 309. The timing advance thereby provides that the message is transmitted early by $\Delta$Tup relative to the base station's symbol boundary 308, so that the uplink data message 307 will be received properly timed with the base station.

To summarize, the user device transmits the uplink data message 307 timed early by the timing advance, as determined by the user device's clock. The uplink data message 307 then propagates to the base station during the uplink propagation delay $\Delta$Tup. Since the user device had previously set its clock later than the base station's clock by one downlink delay $\Delta$Tdown, the user device can apply the timing advance of $\Delta$Tup+$\Delta$Tdown, and thereby cancel both the user device's retard of $\Delta$Tdown and the uplink delay of $\Delta$Tup. Hence the data message 307 arrives at the base station at time T39 which is coincident with the base station's symbol boundary 308, as desired.

In this example, the user device has synchronized its clock time and its clock rate with the base station, and has calibrated the timing advance necessary to provide uplink messages on the base-station's schedule, all without unnecessary messages and while consuming only a few resource elements for four timing signals, according to some embodiments.

Figure 3B:
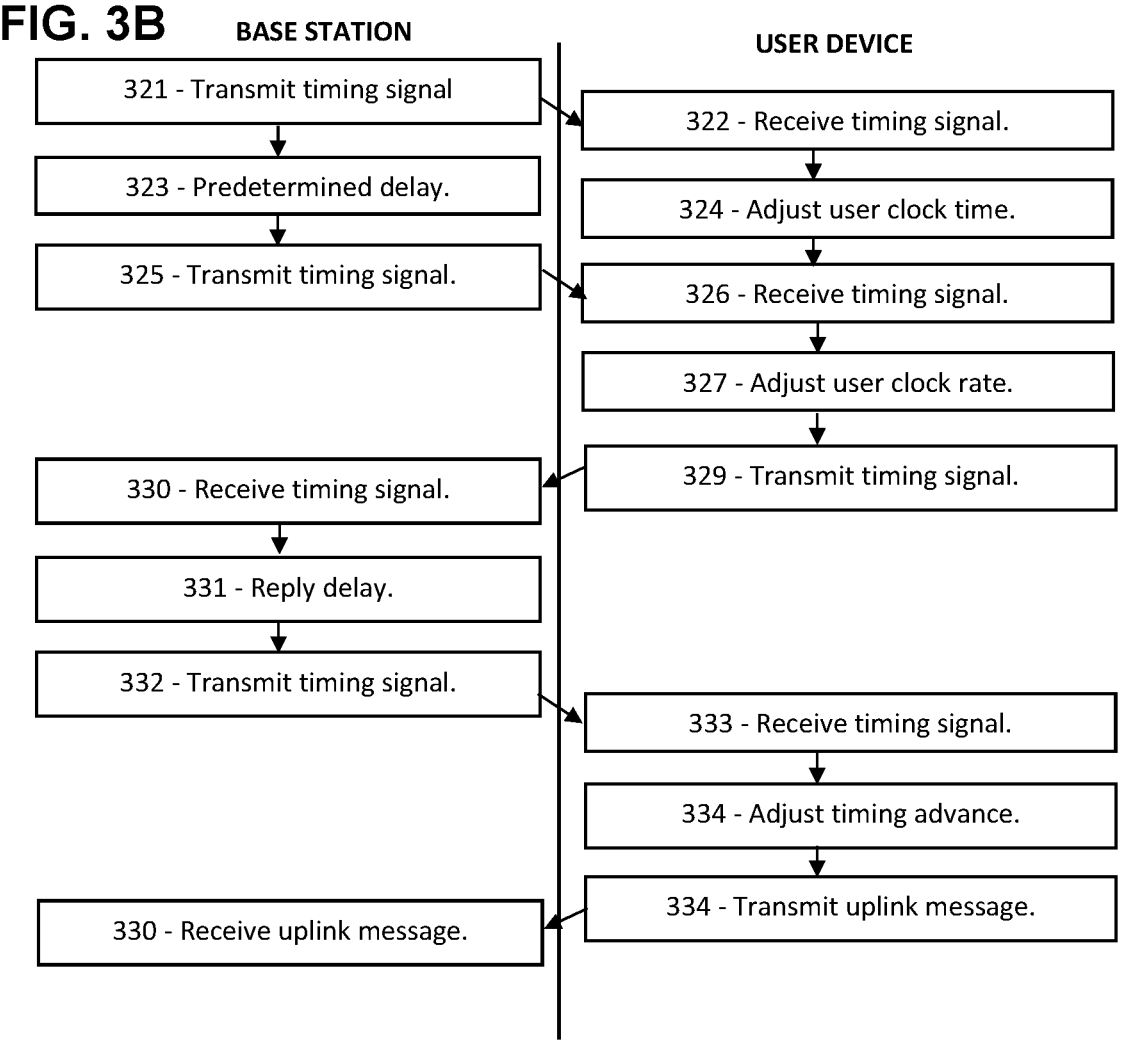
FIG. 3B is a flowchart showing an exemplary embodiment of a timing advance determination procedure, according to some embodiments.

FIG. 3B is a flowchart showing an exemplary embodiment of a timing advance determination procedure, according to some embodiments. As depicted in this non-limiting example, actions of a base station are shown on the left, and of a user device on the right. At 321, on a predetermined periodicity or schedule, the base station broadcasts a timing signal which the user device receives at 322. At 324, the user device then adjusts its clock time according to the scheduled time of the timing signal. At 323, the base station waits a predetermined delay and then at 325 broadcasts a second timing signal, which the user device receives at 326. The user device then either (a) measures the interval between the two timing signals, and compares to the expected interval according to standards, or (b) compares the timing error of the second timing signal to the timing error of the first timing signal. By either method, the user device determines the interval between the two receptions, and then adjusts its clock rate to negate the disagreement relative to the base station's clock rate at 327.

Having now adjusted the user device's clock and clock rate, the timing advance may be determined. At 329, the user device transmits an uplink timing signal on a suitable channel. The channel may be a contention-based channel which permits transmissions at-will, or a scheduled channel in which particular times can be indicated by the timing signals. The base station receives the uplink timing signal at 330. Then, after a predetermined reply delay at 331, the base station transmits a downlink timing signal back to the user device at 332, also on the contention channel. Thus the base station provides that the time between its (the base station's) reception of a timestamp point in the uplink timing signal, and transmitting another timestamp point in the downlink timing signal, is to be equal to the predetermined reply delay.

In another embodiment, the uplink and downlink timing signals 305 306 may be transmitted on the managed channels such as the PUSCH and PDCCH, instead of an at-will channel. In that case, the user device and the base station can include a timestamp point embedded in each timing signal 305 306. Then the user device can determine the elapsed time T37−T34 according to the interval between the transmitted and received timestamp points.

At 333, the user device receives the downlink timing signal and determines the elapsed time between when the user device transmitted the uplink timing signal and when it received the downlink timing signal (or timestamp point). That interval equals the round-trip propagation delay plus the predetermined reply delay Dreply. Thus at 334 the user device calculates the timing advance equal to the elapsed time calculated at 333 minus the known reply delay. As mentioned, the round-trip propagation time is required to compensate for the retarded clock setting of the user device plus the uplink propagation delay.

The user device then transmits an uplink data message using the timing advance, so the uplink data message will arrive at the base station aligned with the base station's resource grid. The base station then receives the uplink data message at 330.

The foregoing examples assumed that the user device was at a fixed location. In the following example, the Doppler frequency shift due to user device motion can be determined according to the frequencies of timing signals, without unnecessary messaging.

Figure 4A:
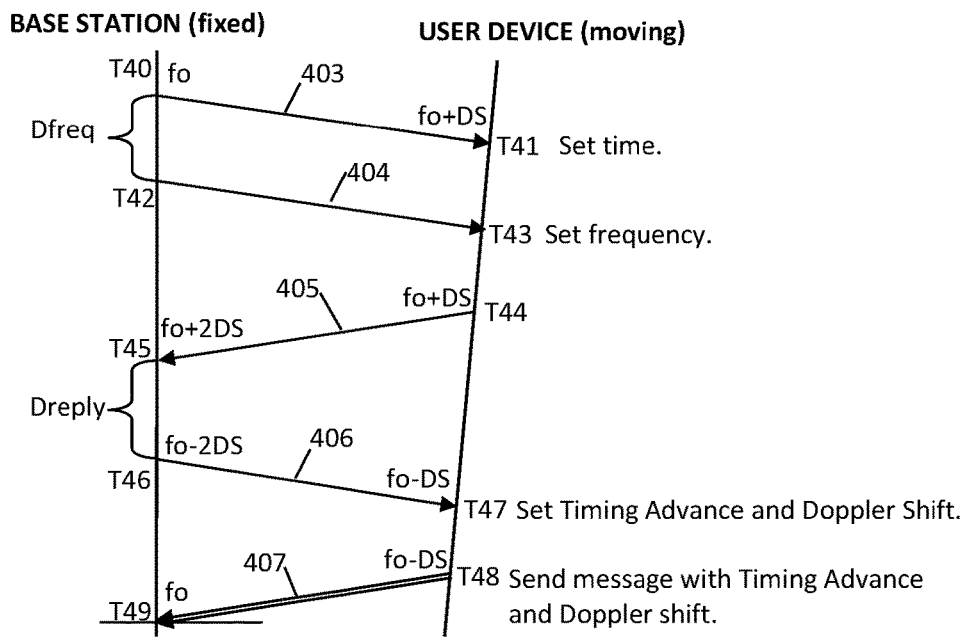
FIG. 4A is a schematic showing an exemplary embodiment of a Doppler shift determination, according to some embodiments.

FIG. 4A is a schematic showing an exemplary embodiment of a Doppler shift determination, according to some embodiments. As depicted in this non-limiting example, a base station can indicate a Doppler shift to a mobile user device according to a frequency of a timing signal. Actions of a base station are shown on the left and those of a user device on the right. Time proceeds downward in the figure. A vertical line on the left indicates that the base station is at a fixed position, while a tilted line on the right indicates that the user device is moving toward the base station. That motion creates a Doppler shift, which modifies time intervals measured by the two entities as well as frequencies of signals exchanged between the two entities. One purpose of this example is to show how the user device can adjust its clock time, clock rate, timing advance, and Doppler shift frequency offset using a timing signal frequency, without exchanging any messages other than extremely brief timing signals, according to some embodiments.

At time T40, according to a predetermined schedule, the base station broadcasts a timing signal 403 at frequency f 0 corresponding to a predetermined subcarrier of a suitable channel such as the PDCCH channel. (For simplicity in this example, it is assumed that the base station clock and all of the channels have the same frequency $f_0$.) The timing signal 403 propagates to the user device and is received at time T41, but its frequency has been changed by a Doppler shift (DS) to $f_0$+DS. The user device then adjusts its clock time according to the scheduled transmission time T40 of the timing signal 403 which is known to the user device. Upon adjusting its clock time, the user device is then synchronized with the base station.

The base station transmits a second timing signal 404 at a time T42. The second timing signal 404 is delayed, after the first timing signal 403, by a predetermined Dfreq delay, which is also known to the user device. The user device then receives the second timing signal 404, measures the interval T43−T41 according to the receiver's clock, compares that interval to Dfreq, and then adjusts its clock rate accordingly. If the user device were stationary, the user device's clock frequency would then be equal to the base station's clock frequency. Due to the motion, however, the user device's clock is Doppler shifted, and now is set to the frequency $f_0$+DS.

The next step is to determine the propagation delay. The user device then, at T44, transmits an uplink timing signal 405 at its set frequency of $f_0$+DS. Thus the frequency of the uplink timing signal 405 is related to (equal to, in this simplified example) the clock rate of the user device. Thus the uplink timing signal 405 is transmitted at $f_0$+DS. The uplink timing signal 405 is then further Doppler shifted by an additional DS, and arrives at the base station at a double-Doppler-shifted frequency of $f_0$+2DS at T45. The base station receives the uplink timing signal 405, and measures the frequency deviation of the uplink timing signal 405, which is now +2DS. The base station thereby determines, from the frequency error, that the user device is in motion and that the Doppler shift is DS.

The base station can then inform the user device of the Doppler shift value DS in various ways. In this example, the base station transmits a downlink timing signal 406 configured to indicate the DS Doppler shift as a frequency. To do so, the base station transmits the downlink timing signal 406 to the user device at a frequency $f_0$-2DS, which is double-Doppler-shifted in the reverse direction from the uplink timing signal 405. The downlink timing signal 406 is transmitted at T46, which is exactly Dreply later than the received time T45 of the uplink timing signal 405, as measured by the base station clock.

The user device then receives the downlink timing signal 406, which was transmitted at frequency $f_0$-2DS, but is now Doppler shifted up to $f_0$-DS when received by the user device, at time T47. The user device also measures the received time of the downlink timing signal 406. The user device then compares the downlink timing signal frequency ($f_0$-DS) to the uplink timing signal frequency ($f_0$+DS) and notes that they are different. The user device therefore concludes that there is a Doppler shift, and that its value is DS (which is half the difference between the frequencies of the uplink and downlink timing signals 405 406 as measured by the user device). The user device then knows that its clock rate is set to $f_0$+DS instead of $f_0$, and that the uplink messages need to be transmitted at $f_0$-DS (relative to the base station's clock), which is $f_0$-2DS relative to the user device's clock, in order to arrive at the base station at the correct frequency of $f_0$. The user device therefore knows that the frequency offset, relative to the user device's clock, must be −2DS to cancel both the frequency error in the user device's clock rate and the Doppler shift associated with the uplink propagation. In other words, due to the Doppler shift in the user device's clock rate, the user device needs to apply a frequency offset of −2DS, relative to the user device's clock. One factor of DS is to negate the clock rate Doppler shift, and the other factor of DS is to negate the uplink Doppler shift of the message. Hence the user device can transmit the uplink message with a frequency of $f_0$-2DS according to its own clock, and the message will arrive at the base station at frequency $f_0$ as desired. As used herein, the frequency offset is relative to the user device's clock rate, not the base station's clock rate.

The user device also measures the time T47 of receiving the downlink timing signal 406, and calculates the elapsed time T47−T44 between sending and receiving the uplink and downlink timing signals 405-406. The elapsed time equals Dreply plus the round-trip propagation delay. However, the receiver's clock is still set to $f_0$+DS instead of $f_0$ due to one Doppler shift. The receiver now knows this and can correct the measurement accordingly. The revised timing advance, corrected for the Doppler shifts, is then (T47−T44−Dreply)× ($f_0$/($f_0$+DS)). In practice, however, intra-network propagation times are generally so short that the Doppler correction of the timing advance is generally negligible, and will be ignored herein.

To summarize, the user device has enough information, from the times T41, T43, T44, and T47 which are accessible to it, and the frequency of the downlink timing signal in which DS is encoded, to calculate the frequency offset and the timing advance. The user device is therefore able to transmit uplink messages that arrive with the correct timing and frequency for the base station's resource grid.

At T48 the user device transmits an uplink message 407 to the base station (doublewide arrow). The uplink message 407 is transmitted on the PUSCH channel in this case. As mentioned, the user device transmits the uplink message 407 at time T48, with the timing advance equal to the measured round-trip propagation time, and with the frequency offset of −2DS as measured by the user device's clock. The base station receives the uplink message 407 at time T49 coincident with the base station's symbol boundary at T49, and at the subcarrier frequency off). (As mentioned, for simplicity, the example assumes the PDCCH and PUSCH and contention channel all share the same frequency as the system clock, $f_0$.)

When configured as indicated by this example, the user device is able to transmit uplink messages that arrive at the base station aligned with the base station's symbol boundaries in time, and aligned with subcarriers in frequency, as desired. In addition, since the user device's clock is retarded by the downlink propagation time, and the clock rate is Doppler shifted by +DS, the user device can receive downlink messages at the time and frequency of the user device's resource grid, as desired. No further corrections or offsets are needed on either uplink or downlink for proper communication, according to some embodiments. Notably, the user device has successfully configured its clock time, clock rate, timing advance, and frequency offset, for ready reception of downlink messages and ready transmission of uplink messages, based on just four brief timing signals. The full synchronization therefore has little or no impact on network throughput, while entirely avoiding legacy prior-art synchronization messages, according to some embodiments.

Figure 4B:
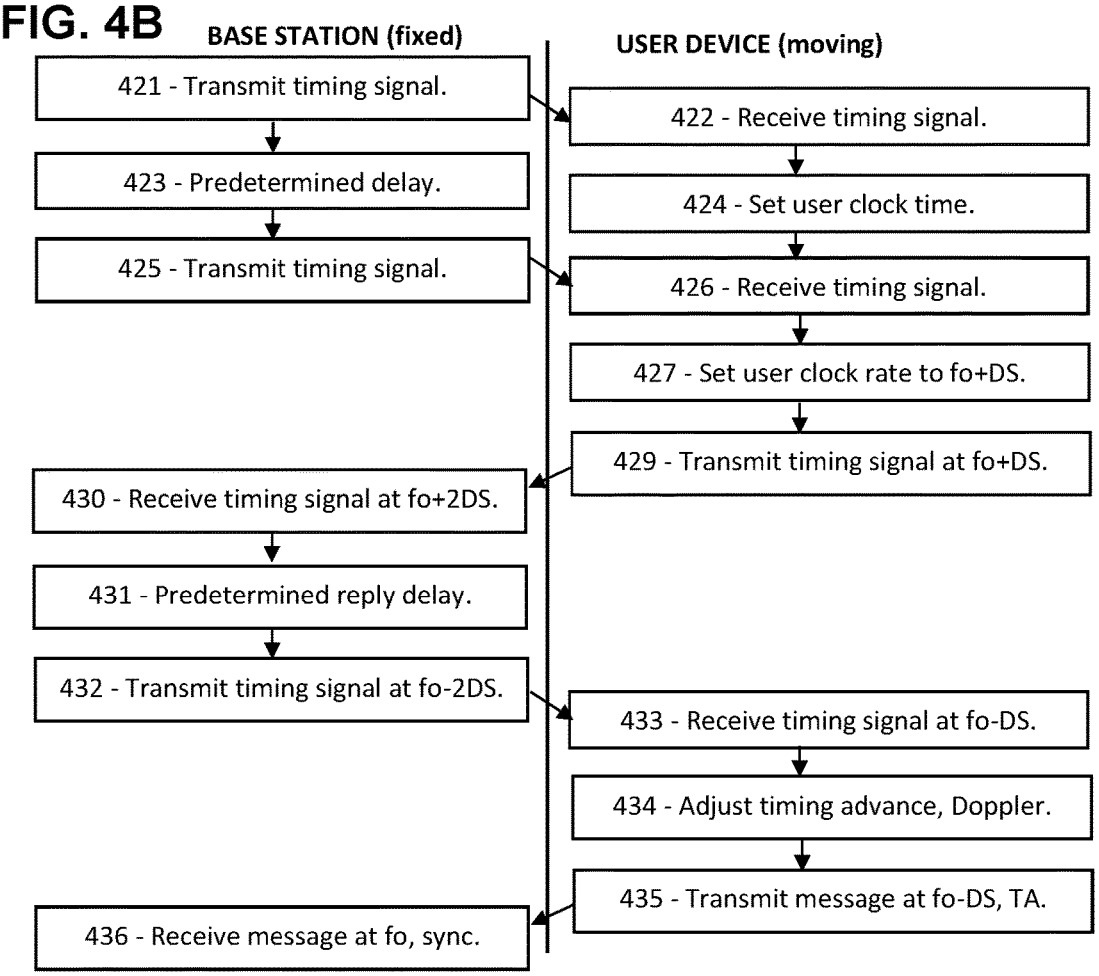
FIG. 4B is a flowchart showing an exemplary embodiment of a Doppler shift determination procedure, according to some embodiments.

FIG. 4B is a flowchart showing an exemplary embodiment of a procedure to determine the Doppler shift, according to some embodiments. As depicted in this non-limiting example, a user device calibrates its clock time, clock rate, timing advance, and Doppler shift frequency offset according to the base station's clock and resource grid. At 421, the base station broadcasts a first timing signal, at frequency $f_0$ according to a predetermined synchronization schedule. The user device receives the first timing signal at 422 after a propagation delay, but at a Doppler-shifted frequency of $f_0$+DS. At 424 the user device sets its clock time to equal the transmission time of the first timing signal, as specified in the synchronization schedule. Therefore, the user device's clock is retarded, relative to the base station's clock, by the propagation delay.

At 423, the base station waits a predetermined Dfreq delay and then broadcasts a second timing signal at 425, which the user device receives at 426. At 427, the user device calculates a time interval between the first and second receptions, compares its measurement to the schedule, determines a frequency error, and adjusts its clock rate to comply. However, due to the Doppler shift, the clock rate is actually set to $f_0$+DS.

At 429, the user device transmits an uplink timing signal at the shifted frequency $f_0$+DS, which the base station receives at 430 but now doubly-Doppler-shifted to $f_0$+2DS, which the base station measures. This frequency error indicates to the base station that the user device is in motion and that the Doppler shift is DS.

After a predetermined Dreply delay at 431, the base station transmits a downlink timing signal at 432, but at the reverse-Doppler-shifted frequency of $f_0$−2DS. The user device receives it at 433, but now upshifted to $f_0$−DS. At 434, the user device measures the frequency as-received, notes that the received frequency differs from the previously transmitted frequency of $f_0$+DS, and concludes that the Doppler shift is DS. The user device then determines that uplink messages are to be transmitted at the frequency of $f_0$−DS so that they will be upshifted to the correct frequency $f_0$ upon reaching the base station. However, since the user device clock is already set at the shifted frequency of $f_0$+DS, the frequency offset is to be −2DS, relative to the user device's clock.

In addition, the user device measures the elapsed time between transmitting its uplink timing signal and receiving the downlink timing signal, subtracts the known Dreply, and sets the timing advance equal to that difference, which is the Doppler-shifted round-trip propagation time.

At 435, the user device sets the frequency offset to −2DS as measured by its own clock, and sets the timing advance equal to the round-trip propagation time as determined from the received time of the downlink timing signal. The user device then transmits an uplink data message with the offset frequency of $f_0$−2DS according to its own clock, and with a timing advance of the round-trip propagation time according to its own clock. At 436 the uplink message is received by the base station at the correct frequency $f_0$ and at the correct time according to the base station's symbol boundaries.

The user device has thus aligned its clock time, clock rate, timing advance, and frequency offset so that downlink messages will arrive aligned with the user device's resource grid, and the uplink messages will arrive aligned with the base station's resource grid, as desired. No prior-art synchronization messages were involved. The only resources used were four very brief timing messages, according to some embodiments.

In this example, the base station used the frequency of the downlink timing message to indicate the Doppler shift to the user device. In the next example, the base station uses a time interval to indicate the Doppler shift more precisely to the user device.

Figure 5A:
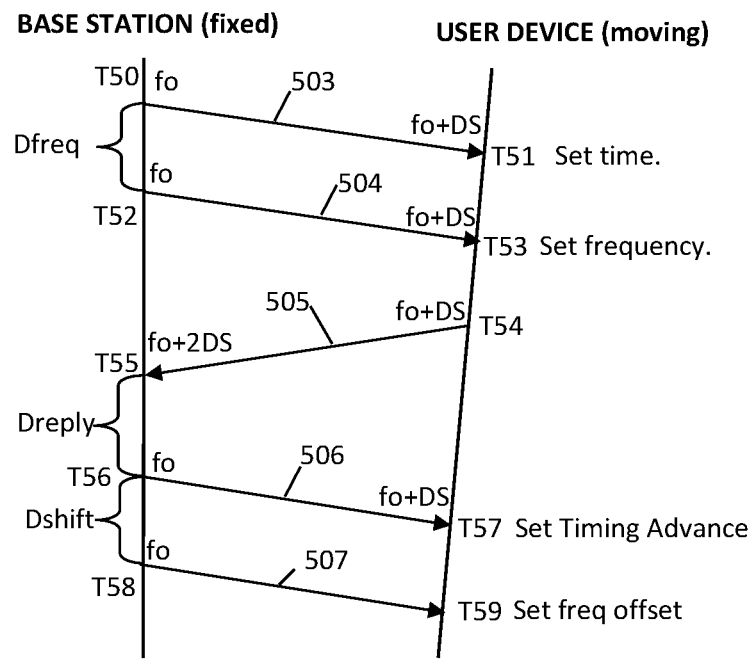
FIG. 5A is a schematic showing an exemplary embodiment of another Doppler shift determination, according to some embodiments.

FIG. 5A is a schematic showing an exemplary embodiment of another Doppler shift determination, according to some embodiments. As depicted in this non-limiting example, a base station can indicate a Doppler shift to a mobile user device according to a time position of a timing signal. Actions of a base station are shown on the left and those of a user device on the right. Time proceeds downward in the figure. A vertical line at left indicates that the base station is at a fixed position, while a tilted line at right indicates that the user device is moving toward the base station. That motion creates a Doppler shift, which modifies time intervals measured by the two entities as well as frequencies of signals exchanged between the two entities. One purpose of this example is to show how the base station can indicate a Doppler shift to a user device, using the time position of a downlink timing signal.

As detailed in the previous example, a user device first sets its clock time and clock frequency according to timing signals. A base station broadcasts two timing signals 503 504 at times T50 T52 separated by a specified Dfreq on the PDCCH channel at frequency $f_0$. The timing signals are received by a mobile user device at times T51 and T53, Doppler shifted to $f_0+DS$. The interval Dfreq as-received is also Doppler shifted proportionally. The user device sets its time according to the scheduled transmission time of the first or second timing signal 503 504, and sets its clock frequency according to the Doppler-shifted interval to $f_0+DS$. (For simplicity, the same frequency $f_0$ is assumed for the master clock and all channels.)

Next the user device determines the timing advance based on the propagation time. The user device transmits an uplink timing signal 505 on a contention-based channel at T54, using the Doppler-shifted frequency of $f_0+DS$ instead of the channel frequency of $f_0$, due to the user device's motion. The base station then receives the uplink timing signal 505 at time T55, with its frequency now double-Doppler-shifted to $f_0+2DS$. The base station determines, from the frequency error, that a Doppler shift of DS is involved.

After a prescribed Dreply delay, the base station transmits a first downlink timing signal 506 at T56, again transmitting at the base station's standard frequency of $f_0$ on the contention-based channel. The user device receives the first downlink timing signal 506 at time T57, but now upshifted to $f_0+DS$. The user device still does not know of the Doppler shift because all of its downlink receptions have been at the same Doppler-shifted frequency of $f_0+DS$. The user device therefore calculates the timing advance equal to the interval between its uplink transmission and its downlink reception at times T57 and T54, and subtracts the known Dreply. The timing advance therefore equals the round-trip propagation time. This timing advance will cause uplink messages to arrive coincident with the base station's symbol-times, by canceling the user device's clock retarded setting plus the uplink travel time. The timing advance accounts for both of those delays.

Finally the base station indicates to the user device that the previous measurements included a Doppler shift of size DS. In the previous example, the base station did this by modifying the frequency of the downlink timing signal. In the present example, the base station does this using a variable time interval instead of a variable frequency. The base station transmits a second downlink timing signal, delayed by a calculated delay time Dshift which is related to the Doppler shift DS. Thus at time T58, after a calculated delay Dshift, the base station transmits a second downlink timing signal 507. The second downlink timing signal 507 is transmitted at the regular frequency $f_0$. The user device detects it at T59, upshifted to $f_0+DS$. The user device then measures the time interval T59–T58 between the receptions of the first and second downlink timing signals 506 507, notes that Dshift is not equal to Dfreq, and therefore determines that there is a Doppler shift involved and that its value is DS. For example, Dshift may equal Dfreq times the Doppler factor $(f_0+DS)/f_0$ from which the user device can determine the Doppler shift DS. Then, having finally determined the Doppler shift, the user device can calculate a frequency offset of $-2DS$ and apply it to subsequent uplink messages. For example, the user device can transmit uplink data messages at the frequency of the uplink timing signal $(f_0+DS)$ plus the frequency offset $(-2DS)$ which therefore equals $f_0-DS$, as desired. The frequency offset is $-2DS$ in this case because the user device's clock frequency was set to $f_0+DS$ in an earlier step, and the uplink message will incur an additional $+DS$ during uplink. Hence the frequency offset to apply, relative to the user device's clock frequency, is $-2DS$ so that uplink messages will arrive at the base station in alignment with the base station's subcarrier frequencies.

For simplicity, the above discussion avoided mentioning that all of the interval measurements made by the user device are also Doppler shifted by the same Doppler factor $(f_0+DS)/f_0$. The timing advance determined by the user device according to the above procedure did not include the Doppler shift and so is off by the Doppler factor. However, this has no effect because the user device's clock rate is also off by the same factor. As a result, the timing advance as determined above will indeed place the uplink messages in correct registration with the base station's symbol boundaries when applied by the user device using the user device's Doppler-shifted clock rate. In a similar way, the Dshift value will be Doppler shifted by the same factor when measured by the user device, but this is again canceled by the user device's Doppler-shifted clock frequency. Thus the user device can provide uplink messages properly aligned with the base station's resource grid, in both time and frequency, by applying the timing advance and frequency offset to uplink transmissions as described, notwithstanding that the user device's clock frequency is set to a Doppler-shifted frequency.

Figure 5B:
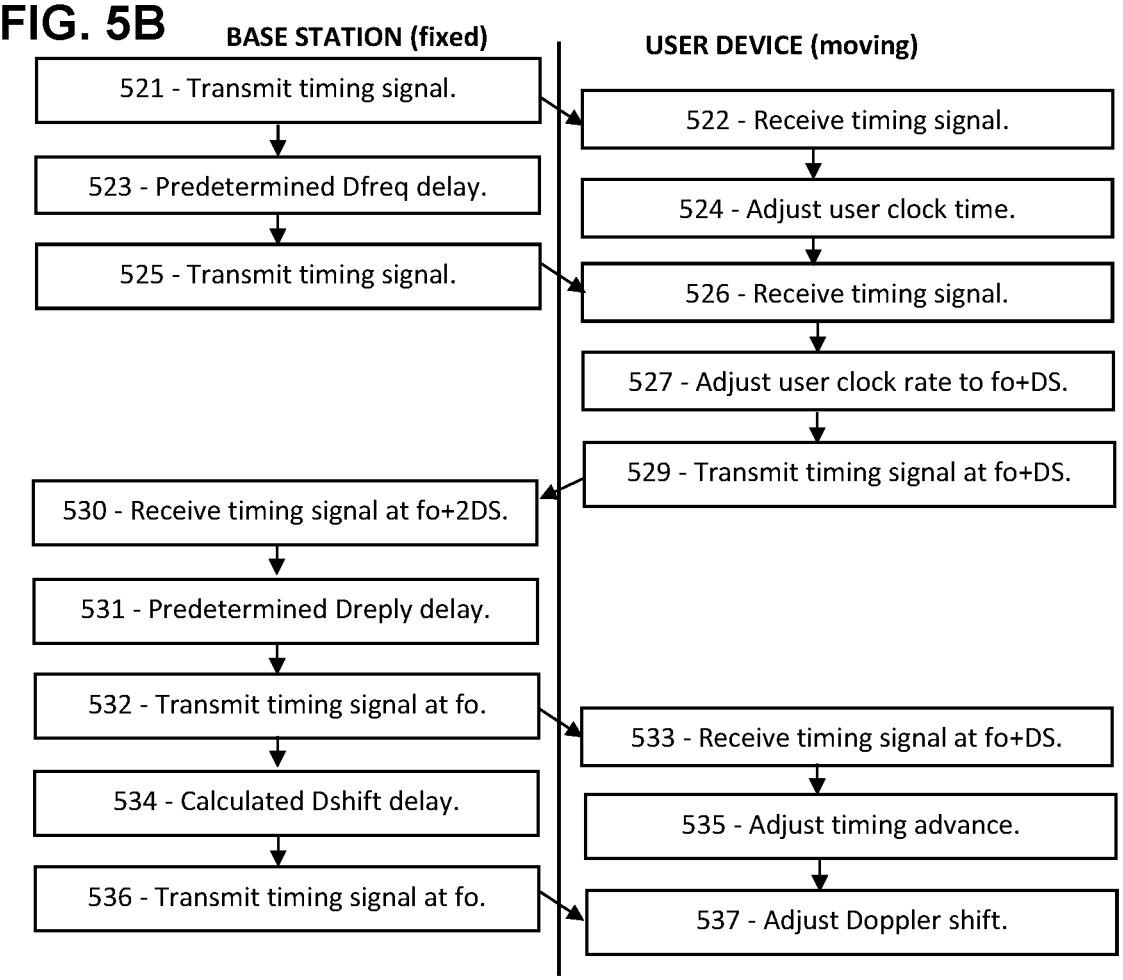
FIG. 5B is a flowchart showing an exemplary embodiment of another Doppler shift determination procedure, according to some embodiments.

FIG. 5B is a flowchart showing an exemplary embodiment of the Doppler shift determination procedure of FIG. 5A, according to some embodiments. As depicted in this non-limiting example, a procedure enables a mobile user device to adjust its clock time and clock frequency for ready reception of downlink messages, and its timing advance and frequency offset for ready transmission of uplink messages, based on brief timing signals.

At 521, on schedule, a base station broadcasts a first timing signal at frequency $f_0$. (In this procedure, all broadcast and downlink signals are transmitted by the base station at the same $f_0$ frequency.) A user device receives the first timing signal at 522 and then adjusts the user device's clock time at 524 equal to the scheduled transmission time of the first timing signal. The user device's clock setting is thereby retarded by one propagation time relative to the base station's clock.

After a predetermined Dfreq delay at 523, the base station transmits a second timing signal at 525, which the user device receives at 526. At 527, the user device calculates the time between reception of the first and second timing signals, compares to the predetermined Dfreq, and therefore sets its clock rate to the Doppler-shifted frequency of $f_0+DS$. Since the user device's clock time is set retarded by one downlink propagation time, and its clock rate includes the downlink Doppler shift, the user device can then receive downlink messages aligned with the user device's resource grid in both time and frequency, without applying further time or frequency corrections. This is a convenient simplification for reduced-capability user devices when the application does not need to know the absolute time.

To adjust the timing advance, the user device at 529 transmits an uplink timing signal at the Doppler-shifted frequency of $f_0+DS$, since the user device does not know, at this point, that its clock is set to a Doppler-shifted frequency. The base station receives the uplink timing signal at 530, but now doubly shifted to frequency $f_0+2DS$ due to the uplink Doppler shift. The base station notes the frequency error and determines that there is a Doppler shift of value DS.

The base station then waits a predetermined Dreply delay 531 before replying at 532 with a downlink timing signal, which is transmitted at the base station's regular frequency of $f_0$. The user device receives it at 533, again Doppler shifted to $f_0+DS$. The user device then calculates the timing advance as the measured time interval between the uplink transmission and the downlink reception, minus the predetermined Dreply delay, which also equals the round-trip propagation time. By this procedure, the user device's uplink messages are retarded by the downlink propagation time according to the user device's retarded clock setting, and then additionally by one uplink propagation time, before reaching the base station. Hence a timing advance equal to the round-trip propagation time provides that the uplink messages can reach the base station coincident with the base station's symbol boundaries, as desired.

As mentioned, the base station determined that the user device is in motion and that the Doppler shift is DS, based on the frequency $f_0+2DS$ of the uplink timing signal. To inform the user device, the base station calculates at 534 a Dshift delay which indicates the value of DS to the user device. For example, Dshift may equal Dfreq times the Doppler factor of $(f_0+DS)/f_0$. The base station then transmits a second downlink timing signal at 536, spaced at Dshift after the first downlink timing signal. The user device receives the second downlink timing signal at 537 and determines that the interval between reception of the first and second downlink timing signals is different from Dfreq, thereby indicating that there is a Doppler shift. At 535, the user device calculates DS based on Dshift, and thereby determines the uplink frequency offset which is −2DS, accounting for the now-known clock frequency shift of +DS and the uplink shift of +DS. The user device can then transmit uplink messages with the timing advance as determined from Dreply and a frequency offset determined from Dshift, thereby causing uplink messages to arrive at the base station aligned with the time and frequency of the base station's resource grid, as desired.

An advantage of the base station indicating the Doppler shift as a time interval, instead of a signal frequency, may be that time intervals are generally easier to measure precisely than brief frequency bursts. Another advantage may be that cumbersome textual and numerical synchronization messages are unnecessary and are avoided. Another advantage may be that the disclosed procedure is sufficiently resource-efficient and rapid and low-complexity, that the user device can recalibrate its timing advance and Doppler shift at frequent intervals, such as once per frame, and can thereby track frequent changes in speed or direction without drifting out of synchronization with the base station, according to some embodiments.

Figure 6A:
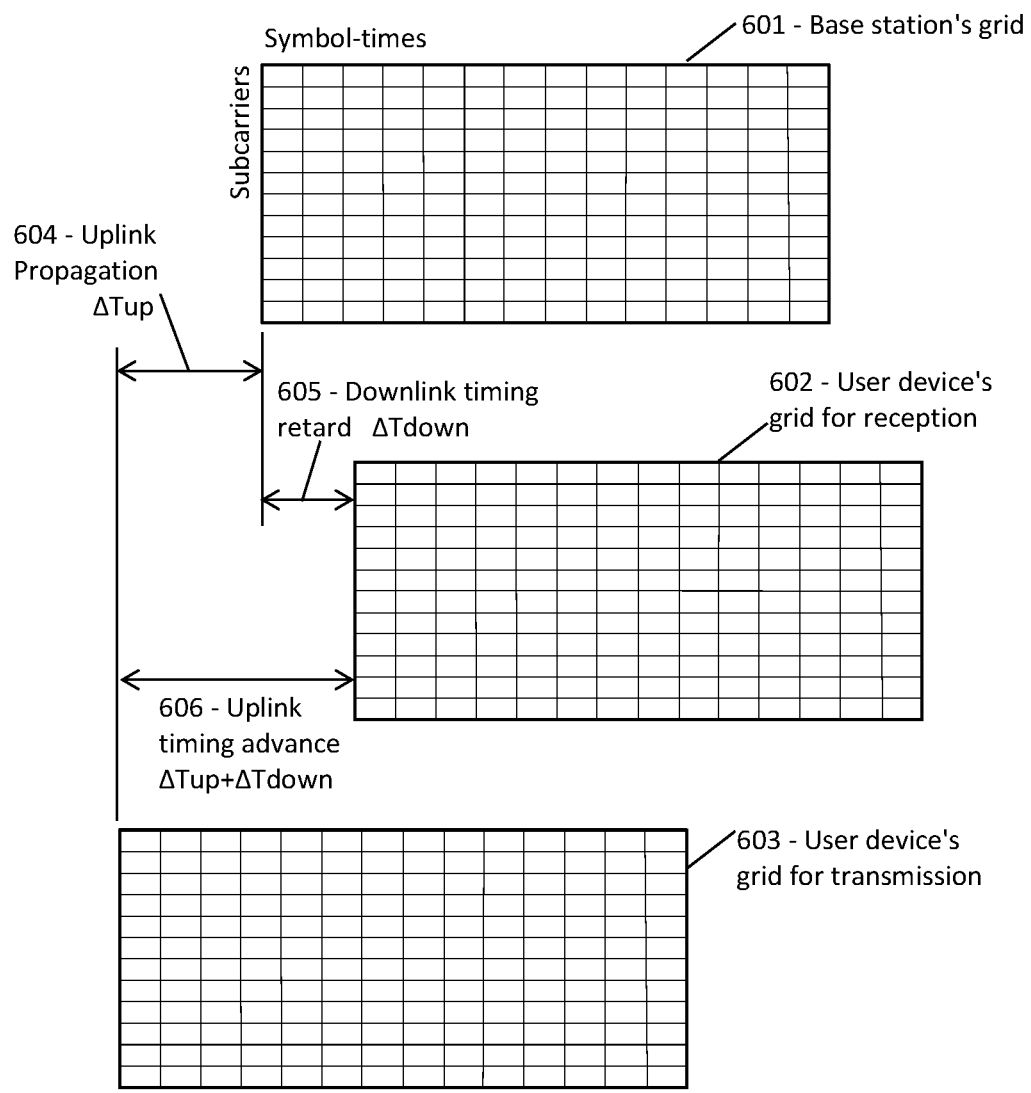
FIG. 6A is a schematic showing an exemplary embodiment of resource grids in a user device and a base station, according to some embodiments.

FIG. 6A is a schematic showing an exemplary embodiment of resource grids of a user device and a base station, according to some embodiments. As depicted in this non-limiting example, three resource grids, with 12 subcarriers in frequency by 14 symbol-times in time, are shown horizontally displaced to represent the timing retard and timing advance. The first grid 601 represents the base station's resource grid which is the master, and all of the user devices are expected to adapt their uplink and downlink timing to the base station's grid 601.

The second grid 602 is the user device's grid for reception according to the user device's clock time. The user device's reception grid 602 is displaced later in time, relative to the base station's grid 601, because the user device's clock is set retarded by one downlink propagation time, as determined by the arrival time of a scheduled timing signal. Therefore, the user device's reception grid 602 is retarded relative to the base station's grid 601 by the downlink propagation time 605 (ΔTdown).

The third grid 603 is the user device's grid for transmission, which is set earlier than the user device's grid for reception 602 by the timing advance 606. The timing advance 606 in this case is the round-trip travel time (ΔTup+ΔTdown). The user device's grid for transmission 603 is therefore advanced relative to the base station's grid by the difference between the timing advance 606 and the reception retard 605, which is therefore the uplink propagation time 604 (ΔTup). The timing advance 606 is defined by the user device relative to the user device's grid for reception 602, and not relative to the base station's grid 601, because the user device generally does not know the timing of the base station's grid 601.

The user device's grids are timed according to timing signals received from the base station. The timing retard 605 of the user device's reception grid 602 is determined by the arrival time of a first downlink timing signal which includes the downlink propagation delay ΔTdown. The timing advance of the user device's transmission grid 603, relative to its reception grid 602, is determined by an elapsed time between transmission of an uplink timing signal and reception of a downlink timing signal, thereby representing the round-trip propagation delay.

With the user device's grids 602 and 603 arranged in time as shown, the user device can thereby receive downlink messages according to its reception grid 602 without further time adjustments, and can transmit uplink messages according to its transmission grid 603 without further timing adjustments, as required. The user device does not know, nor need to know, the actual values of the uplink and downlink propagation times, nor the asymmetry between them if any.

FIG. 6B is a schematic showing another exemplary embodiment of resource grids of a user device and a base station, according to some embodiments. As depicted in this non-limiting example, portions of three resource grids are shown vertically displaced to represent frequency shifts.

The first grid portion 621 represents the base station's resource grid which is the master, and all of the user devices in a network are expected to adapt their uplink and downlink frequencies to the base station's grid 621.

The second grid portion 622 is the user device's grid for reception, which is set according to a Doppler-shifted time interval (called Dfreq in previous examples). The user device's reception grid is therefore Doppler-shifted by 1 DS 624, relative to the base station's grid 621. For a frequency $f_0$ of the base station's grid 601, the corresponding frequency of the reception grid 602 is $f_0+DS$ due to motion of the user device. The user device can therefore receive Doppler-shifted downlink messages properly aligned with the user device's Doppler-shifted reception grid 602.

The third grid portion 623 is the user device's grid for transmission, which is set reverse-Doppler-shifted by a frequency offset (−2DS 626) relative to the user device's grid for reception 622. The frequency offset cancels the Doppler shift of the reception grid 602 plus the uplink Doppler shift 625 to the base station. Therefore, uplink messages will arrive properly aligned with the base station's grid 621 on arrival at the base station.

The frequency offset 626 is defined by the user device relative to its own grid for reception 622, and not relative to the base station's grid 621, because the user device generally does not know the actual frequency of the base station's grid 621. The user device's grid frequencies are determined by the frequency of a downlink timing signal, and by an indication from the base station. The indication from the base station may be a frequency of an additional downlink timing signal, or it may be indicated according to a time interval between two downlink timing signals, as mentioned previously. In either case, the user device can adjust its transmission frequency offset so that its uplink messages will arrive at the base station Doppler-shifted back into the base station's grid 621, as desired.

When the user device has adjusted its clock time, clock frequency, timing advance, and frequency offset according to the examples of FIGS. 6A and 6B, the user device can thereby receive downlink messages according to the symbol-times and subcarrier frequencies of its grid for reception 602 and 622 without further time or frequency adjustments, and can transmit uplink messages according to its grid for transmission 603 and 623 without further timing or frequency adjustments. Hence the procedures disclosed herein can provide full reception and transmission synchronization and synchronization of each user device with the base station, using a few brief timing signals. The ultra-lean low-complexity procedures disclosed herein can avoid the textual and numerical synchronization messages of prior art, thereby providing precision synchronization while saving time and resources, according to some embodiments.

Figure 7A:
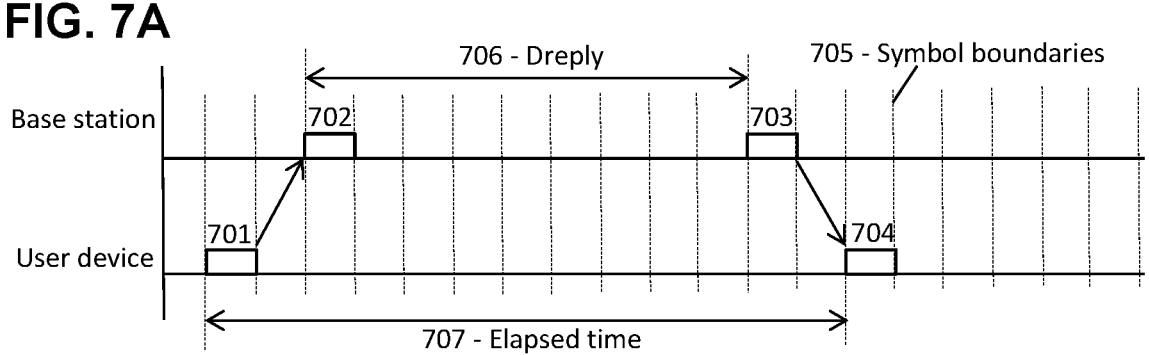
FIG. 7A is a schematic showing an exemplary embodiment of a procedure for determining a round-trip propagation time, according to some embodiments.

FIG. 7A is a schematic showing an exemplary embodiment of a procedure for determining a round-trip propagation time, according to some embodiments. As depicted in this non-limiting example, actions of a base station are shown on the first line, actions of a user device are shown on the second line, and time is horizontal. The example indicates how the user device can determine the round-trip propagation time as mentioned in the examples of FIGS. 3A, 4A, and 5A as well as other interval measurements. Timing signals are shown as rectangles, symbol boundaries are shown as dotted lines, and causation is shown as an arrow. For clarity, the symbol boundaries 705 of the base station's resource grid and the user device's resource grid are assumed to coincide, and the retardation and timing advance are ignored. In this example, each timing signal is shown bounded within a pair of symbol boundaries 705. If the timing signals span two or three symbol-times, the dashed symbol-time boundary lines 705 are to be seen as spaced apart by two or three symbol-times. Thus each timing signal is associated with one of the symbol boundaries, such as the symbol boundary at the leading edge of each timing signal.

The user device's uplink timing signal as-transmitted 701 is shown, and also as-received 702 by the base station. After a predetermined Dreply delay, the base station's reply signal 703 is shown, along with the as-received reply signal 704 at the user device. The intent is to measure the elapsed time interval 707 and subtract the Dreply delay 706, the remainder being the round-trip propagation time. As indicated by arrows, the elapsed time 707 is not measured between the uplink transmission 701 and the downlink reception 704 of the timing signal. Instead, the elapsed time is measured between the pre-configured symbol boundaries at the beginning of each timing signal. Likewise, the Dreply delay 706 is configured to equal an integer number of symbol-times and therefore the as-received uplink timing signal 702 and the as-transmitted reply timing signal 703 are configured between symbol boundaries 705.

An advantage of the arrangement of FIG. 7A may be that the timing signals may be easy for the recipient to detect using the regular signal processing for message elements that fit between the symbol boundaries. However, the time resolution is limited to the symbol-time, which may be too coarse for some applications. Therefore, a second procedure is disclosed in the next figure that may provide finer time resolution.

Figure 7B:
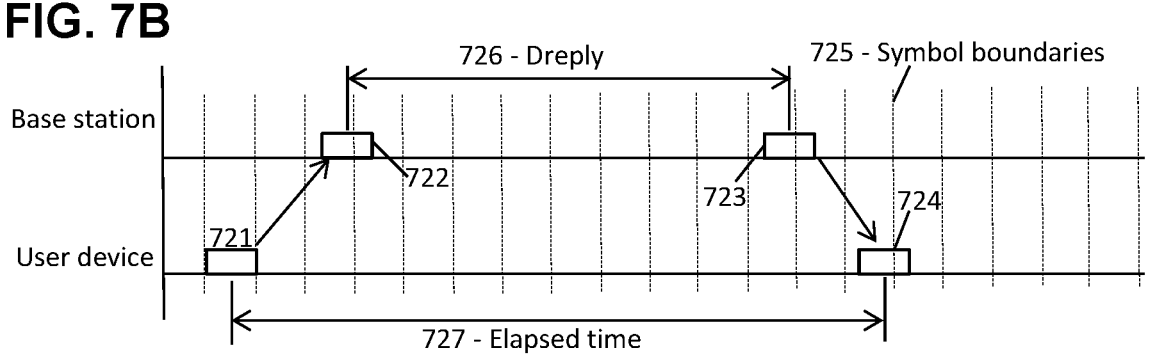
FIG. 7B is a schematic showing an exemplary embodiment of a procedure for determining a round-trip propagation time using timing signals no aligned with symbol boundaries, according to some embodiments.

FIG. 7B is a schematic showing an exemplary embodiment of a procedure for determining a round-trip propagation time using timing signals not aligned with symbol boundaries, according to some embodiments. As depicted in this non-limiting example, the timing signals are received by the recipient at an arbitrary position relative to the symbol boundaries 725, instead of between symbol boundaries. In addition, the receiver can determine times based on a "fiducial" of each timing signal such as the leading edge or trailing edge or midpoint of the timing signal. By measuring time intervals between fiducials of timing signals, instead of symbol boundaries, the user device may thereby obtain substantially finer time resolution. In the figure, the fiducial is depicted as the midpoint of the timing signal.

The uplink timing signal 721 is received by the base station 722, after one uplink propagation time, not aligned with the symbol boundaries 725. The base station determines the time of the as-received uplink timing signal 722 according to the fiducial of the uplink timing signal 722.

The base station then waits exactly Dreply 726, and then transmits the reply timing signal 723. Hence the reply timing signal is not aligned with the symbol boundaries 725, and the as-received reply timing signal 724 is also not aligned with the symbol boundaries 725.

The user device can then determine the elapsed time 727 between the fiducial of its uplink timing signal 721 and the fiducial of the as-received downlink timing signal 724.

The user device can determine the fiducial of the timing signals 722 724 in several ways, depending on implementation. For example, the receiver can use software configured to detect the start and/or end of a timing signal transmission, which may occur at an arbitrary time within a symbol-time. Alternatively, the receiver can measure the average amplitude or total energy deposited by the as-received timing signal 722 724 in two adjacent symbol-times that are overlapped by the timing signal, and can determine the time of the fiducial by comparing those two amplitude measurements. In another embodiment, the receiver can detect the leading edge and the trailing edge using a thresholded time-to-digital converter. By these means or others that artisans may devise, the receiver can determine the elapsed time 727 between the as-transmitted uplink timing signal 721 and the as-received downlink timing signal 724, and thereby determine the round-trip propagation time and the timing advance for proper uplink messaging.

Figure 7C:
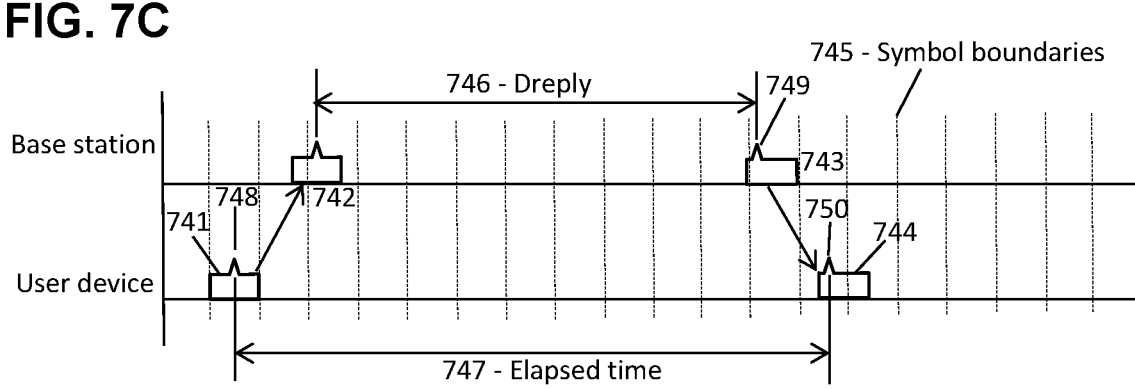
FIG. 7C is a schematic showing an exemplary embodiment of a procedure for determining a round-trip propagation time using timestamp points, according to some embodiments.

FIG. 7C is a schematic showing an exemplary embodiment of a procedure for determining a round-trip propagation time using timestamp points as fiducials, according to some embodiments. As depicted in this non-limiting example, the user device can configure the uplink timing signal 741 with a timestamp point 748 embedded in the signal, which a receiver can detect. The timestamp point 748 may be an abrupt change in modulation such as a change in phase or amplitude, or an amplitude spike as shown, or a sudden interchange between the I and Q branches of QAM, for example.

The as-received uplink timing signal 742 is shown after an uplink propagation time. The base station can determine the time of the timestamp point on the uplink timing signal 742 relative to the symbol boundaries 745 of the base station, and can then wait a Dreply delay 746, and then transmit a downlink timing signal 743 with another timestamp point positioned exactly Dreply later than the uplink timestamp point was received. In the example, both the user device and the base station transmit their timing signals 741 743 aligned with the symbol boundaries 745. The as-received timing signals 742 744 are not aligned with the symbol boundaries because the propagation time is an arbitrary delay. Therefore, in order to provide the downlink timestamp point 749 exactly Dreply later than the received timestamp point, the base station configures the downlink timestamp point 749 sufficiently off-center of the transmitted timing signal 743 as shown.

The user device then, after a downlink propagation delay, receives the downlink timing signal 744 and measures the elapsed time 747 between the as-transmitted timestamp point 748 and the as-received timestamp point 750. In general, a timestamp point can be configured to provide finer time resolution than a timing signal, due to the abrupt and localized modulation change. Therefore, the user device may obtain a more precise measure of the elapsed time 747, and hence of the timing advance, by use of timestamp points as fiducials in the timing signals.

Figure 7D:
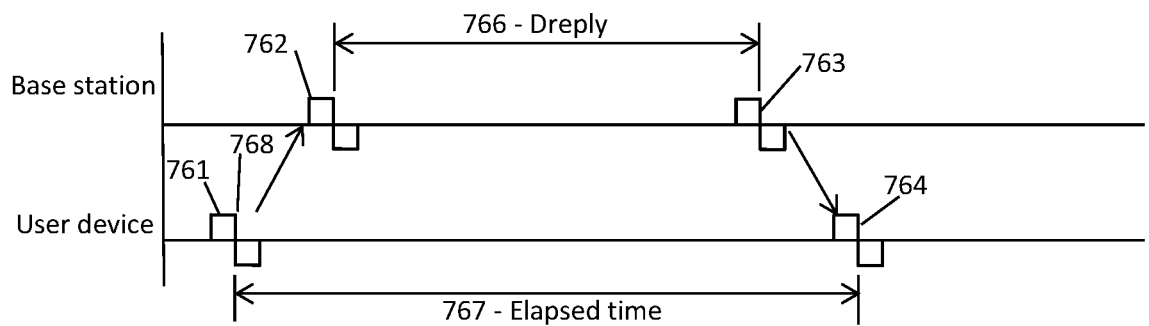
FIG. 7D is a schematic showing an exemplary embodiment of a procedure for determining a round-trip propagation time using timestamp points not aligned with symbol boundaries, according to some embodiments.

FIG. 7D is a schematic showing an exemplary embodiment of a procedure for determining a round-trip propagation time using timestamp points not aligned with symbol boundaries, according to some embodiments. As depicted in this non-limiting example, a base station and a user device exchange timing signals on a channel that is not demarked in symbol-times. The transmitter can transmit a timing signal at any time that the channel is scheduled to be available, and the receiver can detect timing signals and can measure the time of a timestamp point in a timing signal.

In the example, the user device transmits a timing signal 761 at-will to initiate a round-trip propagation time measurement. The timing signal 761 includes a timestamp point 768 depicted here as an abrupt reversal of the amplitude. The transmitted uplink timing signal is then received 762 by the base station, which then waits the Dreply delay 766 and then transmits a downlink timing signal 763, which the user device receives as 764. The user device then determines the elapsed time 767 between the timestamp points and thereby determines the timing advance for uplink messages.

In another embodiment, the channel may include symbol boundaries and the other scheduling of a managed wireless channel, but the user device and the base station may simply ignore those features in transmitting and processing the timing signals. Software may be provided to recognize the start and end of a timing signal or a timestamp point and calculate the timing advance accordingly.

An advantage of the depicted procedures of FIG. 7A-7D may be that the user device can determine the timing advance, by which uplink messages may arrive synchronous with the base station's resource grid, while consuming only four very brief timing signals. Message-heavy synchronization procedures of the prior art can thereby be avoided, saving substantial time and power, and avoiding contributing unnecessarily to the electromagnetic background.

Due to the many options and variations disclosed herein, and other versions derived therefrom by artisans after reading this disclosure, it would be helpful for a wireless standards committee to establish conventions governing formats and implementation options for such ultra-lean procedures and precision synchronization, as disclosed. Such beneficial timing and frequency alignment procedures may enable users to communicate in 5G and 6G multi-GHz bands with increased reliability, while avoiding unnecessary signaling and delays.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a user device of a wireless network to communicate with a base station of the wireless network, the method comprising:
   a) configuring a transmission resource grid and a reception resource grid, wherein each grid, of the transmission resource grid and the reception resource grid, comprises symbol-times in time and subcarriers in frequency, the symbol-times and subcarriers according to a clock of the user device;
   b) determining a downlink propagation time interval comprising a time interval for a downlink signal to propagate from a transmitter in the base station to a receiver in the user device;
   c) retarding the symbol-times of the reception resource grid, relative to symbol-times of a base station resource grid, by the downlink propagation time interval;
   d) determining a round-trip propagation time interval comprising the downlink propagation time interval plus a time interval for an uplink signal to propagate from a transmitter of the user device to a receiver of the base station;
   e) advancing the symbol-times of the transmission resource grid, relative to the symbol-times of the reception resource grid, by the round-trip propagation time interval;
   f) transmitting, according to the transmission resource grid, an uplink message to the base station;
   g) receiving, according to the reception resource grid, a downlink message from the base station;
   h) transmitting, according to the transmission resource grid, a further uplink data message to the base station;
   i) wherein the further uplink data message comprises message elements, each message element of the further uplink data message comprising a received time and a received frequency, as received by the base station;
   j) wherein, for each message element of the further uplink data message, the received time is configured, by the user device, to be aligned with a symbol-time of the base station resource grid; and
   k) wherein, for each message element of the further uplink data message, the received frequency is configured, by the user device, to be aligned with a subcarrier of the base station resource grid.

2. The method of claim 1, wherein the uplink and downlink messages are configured according to 5G or 6G technology.

3. The method of claim 1, further comprising:
   a) determining, according to a system information message broadcast by the base station, the frequencies of the subcarriers of the base station resource grid;
   b) determining a Doppler shift DS related to a motion of the user device;
   c) shifting the frequencies of the subcarriers of the reception resource grid by +DS in frequency, relative to subcarriers of the base station resource grid; and
   d) shifting the subcarriers of the transmission resource grid by −2DS relative to the subcarriers of the reception resource grid.

4. The method of claim 3, further comprising:
   a) transmitting a second uplink message to the base station, wherein a frequency of the second uplink message comprises a frequency of a subcarrier of the transmission resource grid; and
   b) then receiving a second uplink message from the base station, wherein a frequency of the second downlink message comprises a frequency of a subcarrier of the reception resource grid.

5. The method of claim 1, further comprising:
   a) receiving a downlink data message transmitted by the base station;
   b) wherein the downlink data message comprises message elements, wherein each message element, as transmitted, comprises a resource element of the base station resource grid;
   c) determining, by the user device, message elements of the downlink message as received by the user device;
   d) determining, by the user device, for each message element of the downlink message, a received time and a received frequency; and
   e) determining, by the user device, for each message element of the downlink message, a symbol-time of the reception resource grid according to the received time, and a subcarrier of the reception resource grid according to the received frequency.

6. The method of claim 1, further comprising:
   a) determining, according to a system information message, a first scheduled time at which the base station is to transmit a first timing signal, wherein the first scheduled time is according to a clock of the base station;
   b) receiving the first timing signal at a first received time, according to a clock of the user device;
   c) determining a clock error comprising the first received time minus the first scheduled time; and
   d) subtracting the clock error from the clock of the user device.

7. The method of claim 6, further comprising:
   a) determining, according to the system information message, a time interval Dfreq;

b) receiving a second timing signal which is scheduled to be transmitted at a time Dfreq later than the transmission of the first timing signal, according to the clock of the base station;
c) determining, according to the clock of the user device, a second received time at which the second timing signal is received;
d) determining an error ratio comprising a difference between the first and second received times, divided by Dfreq;
e) determining a frequency offset comprising a frequency of the user device times the error ratio; and
f) reducing a clock rate of the clock of the user device, by the frequency offset.

8. The method of claim 7, further comprising:
a) determining, according to the system information message, a time interval Dreply;
b) transmitting an uplink message at an uplink time, according to the clock of the user device;
c) receiving a first reply message at a first reply time, according to the clock of the user device;
d) wherein the first reply message is transmitted by the base station at a time Dreply later than a time when the base station received the uplink message, according to the clock of the base station; and
e) determining the round-trip propagation time interval by calculating the first reply time, minus the uplink time, minus Dreply.

9. The method of claim 8, further comprising:
a) determining a Doppler shift DS comprising one-half times a difference between a frequency of the uplink message and a frequency of the first reply message, according to the clock of the user device; and
b) for each subcarrier of the transmission resource grid, adjusting a frequency of the subcarrier by a frequency correction equal to −2DS, according to the clock of the user device.

10. The method of claim 8, further comprising:
a) receiving a second reply message at a second reply time;
b) determining, according to the clock of the user device, a time interval D12 between the first and second reply times;
c) determining a Doppler shift DS according to a difference between Dfreq and the time interval D12; and
d) for each subcarrier of the transmission resource grid, adjusting a frequency of the subcarrier by a frequency correction equal to −2DS.

\* \* \* \* \*